United States Patent
Crupi

(10) Patent No.: US 9,267,814 B2
(45) Date of Patent: Feb. 23, 2016

(54) SYSTEM AND PROCESS FOR DETERMINING OFFSETS OF MEASURING INSTRUMENTS

(75) Inventor: Santino Crupi, Turin (IT)

(73) Assignee: PSC ENGINEERING S.R.L., Turin (IT)

( * ) Notice: Subject to any disclaimer, the term of this patent is extended or adjusted under 35 U.S.C. 154(b) by 494 days.

(21) Appl. No.: 13/820,962

(22) PCT Filed: Sep. 13, 2011

(86) PCT No.: PCT/IT2011/000319
§ 371 (c)(1),
(2), (4) Date: Mar. 5, 2013

(87) PCT Pub. No.: WO2012/038995
PCT Pub. Date: Mar. 29, 2012

(65) Prior Publication Data
US 2013/0179106 A1    Jul. 11, 2013

(30) Foreign Application Priority Data
Sep. 20, 2010   (IT) .............................. TO2010A0764

(51) Int. Cl.
*G06F 19/00* (2011.01)
*G01D 3/036* (2006.01)
*G01D 3/032* (2006.01)
*G01D 5/244* (2006.01)

(52) U.S. Cl.
CPC ............... *G01D 3/036* (2013.01); *G01D 3/032* (2013.01); *G01D 5/2448* (2013.01); *G01D 5/24495* (2013.01)

(58) Field of Classification Search
CPC ...... G11B 7/0945; G11B 7/094; G11B 5/2448
USPC ............................................ 702/87, 182–185
See application file for complete search history.

(56) References Cited

U.S. PATENT DOCUMENTS

| | | | |
|---|---|---|---|
| 6,215,426 B1 * | 4/2001 | Taniguchi | G01D 5/24476 341/111 |
| 6,498,409 B1 | 12/2002 | Collier-Hallman et al. | |
| 2004/0210411 A1 | 10/2004 | Koo et al. | |
| 2009/0121769 A1 | 5/2009 | Baus | |
| 2010/0164425 A1 | 7/2010 | Son et al. | |

OTHER PUBLICATIONS

Crupi et al., International Search Report issued in parent International Patent Application PCT/IT2011/000319 on Jan. 17, 2012.

* cited by examiner

*Primary Examiner* — Edward Raymond
(74) *Attorney, Agent, or Firm* — Karish & Bjorgum, PC

(57) ABSTRACT

A system (1) is described for determining offsets ($\delta$) of measuring instruments, in particular of measures with a null or constant mean value, composed of first processing means (3) adapted to compute, from at least one value of a measuring signal (S) deriving from an instantaneous measure performed by at least one measuring instrument or a sensor, at least one offset value ($\delta$) of such signal (S); and second processing means (5) adapted to subtract such offset value ($\delta$) from the value of the instantaneous measure signal (S) to obtain a corrected measure value (S–$\delta$) of such signal S. A process is also described for determining offsets ($\delta$) of measuring instruments, in particular of measures with a null or constant mean value.

10 Claims, 1 Drawing Sheet

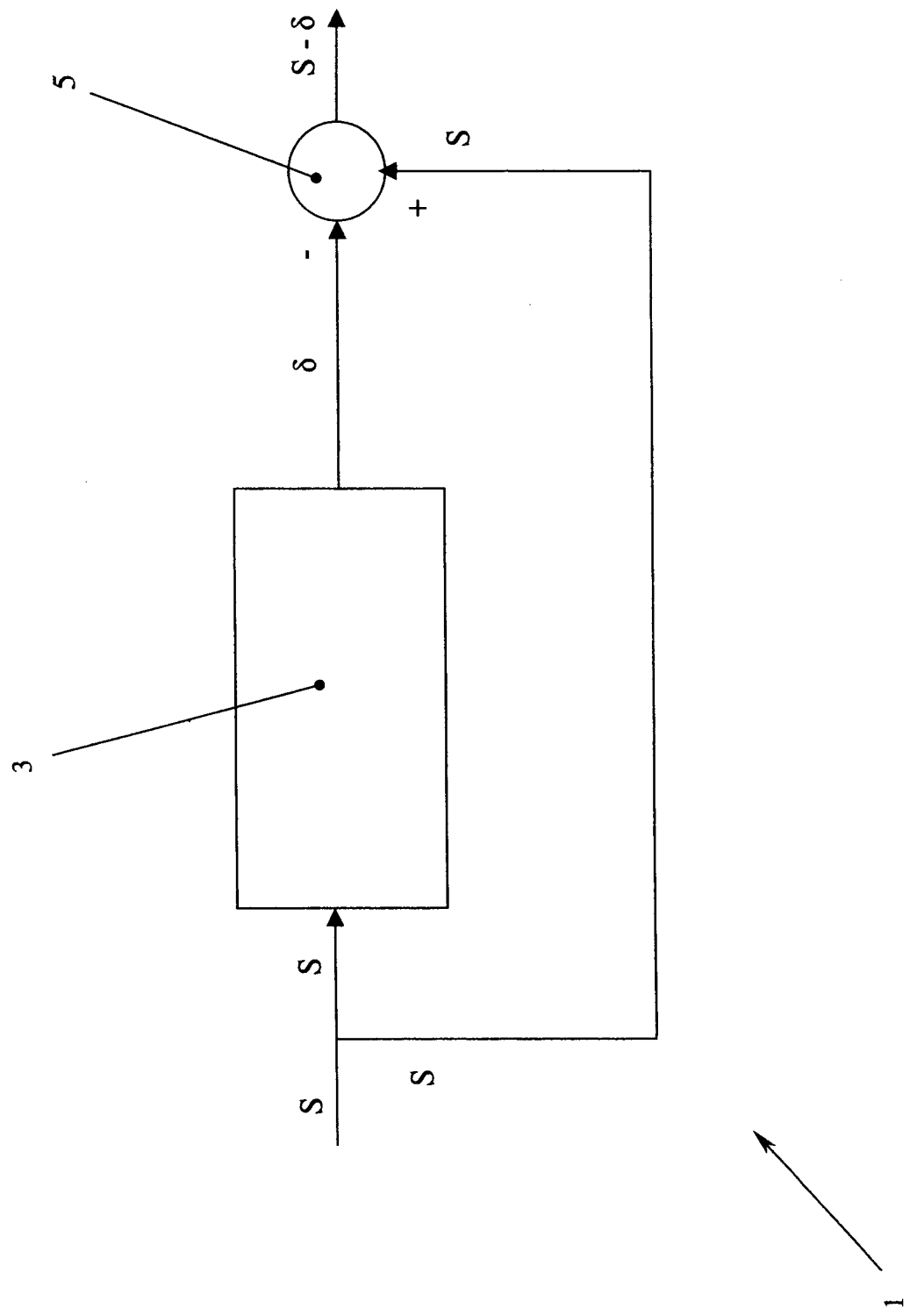

SYSTEM AND PROCESS FOR DETERMINING OFFSETS OF MEASURING INSTRUMENTS

CROSS-REFERENCE TO RELATED APPLICATIONS

The present Application is a national stage of International Patent Application No. PCT/IT2011/000319, titled "System and Process for Determining Offsets of Measuring Instruments," filed Sep. 13, 2011, which claims priority from Italian Patent Application No. TO2010A000764, filed Sep. 20, 2010, the contents of which are incorporated in this disclosure by reference in their entirety.

BACKGROUND OF THE INVENTION

1. Field of the Invention

The present invention refers to a system for determining offsets (bias) of measuring instruments (included electronic adaptation and interface), in particular measures with null or constant mean value. The present invention is applicable to all sensors, complete of electronic interfacing, used to measure variations of one physical phenomenon: there is a steady state condition and a variation respect to this condition. When the interest is the real value of physical phenomena it is necessary to use a sensor with adequate absolute precision; it isn't possible to subtract bias (offsets). If the interest is the variation respect to the steady state value, it is possible to estimate offsets and to applier the present invention. The known that the physical phenomena moves respect a constant mean value allows the estimation of offsets (bias) and the measure, with the presented method, of physical phenomena with very high precision (higher the sensors used). The present invention further refers to a process for determining offsets of measuring instruments through a system according to the present invention. It is applicable to all type of sensors: linear or angular position, speed and acceleration sensors, pressure, temperature, rate of flow, heading, etc. to measure the variation with very high resolution or with a precision better than the original physical sensor. The method allows estimating total bias (due to sensor, its physical arrangement and its conditioning and adapting electronic circuits)

2. Background Information

As known, any measuring instrument or sensor is substantially affected by an offset composed of two types of errors:
- systematic measuring errors, constant and dependent from the physical principle used and the sensibility of the instrument or sensor itself;
- slowly-varying errors, dependent from environmental and use conditions in which the instrument or sensor has to operate, such as for example temperature, pressure, humidity, instrument and electronic ageing, height variation on sea level (for accelerometers measure), etc.

When measures performed by the measuring instrument have a null or constant mean value, or point out the difference with respect to a fixed position, it is possible to determine the measuring error rather accurately, and thereby clean the measure itself from the global error, as sum of fixed and slowly-varying errors with respect to the dynamics of the system to which it is applied.

In particular, for example, it is also known in the art that angular speed sensors have a particularly important role in stabilisation systems for roll and pitch in boats and other different systems, since the rolling speed has a major weight on the efficiency of adjustments through fins. In order to be able to use sensors with acceptable costs, currently angular speed sensors are used with a ±50°/s full scale, while the working range for measures is on the maximum order of magnitude of 2 or 3°/s. Every sensor therefore has a systematic error and a slowly-varying error that depends on environmental temperature, ageing, and other above-mentioned conditions: this error is typically on the order of 1%. In this case the measuring error is of the same order of magnitude of the amount that has to be measured, and it would therefore be essential to clean the sensor from fixed and (slowly with respect to the phenomenon that has to be detected) varying errors automatically, and obtain a measure with a better accuracy than the one obtained by the pure sensor. However, without the estimation and subtraction of this error, it is not possible to use the sensor importantly and with relevant efficiency with respect to other measures and, consequently, the regulating systems, in which the sensor is used, cannot have relevant performances.

Similar example is the problem of estimation of the vertical movement of an object. To make a good estimation of vertical movement is necessary to extract'the bias of accelerometer measure; this is possible, with the present invention, with the estimation and subtraction of the bias. The offset of accelerometers changes with temperature, sensor ageing, height respect the sea level, etc. The present invention allows the correct calculation of bias and its subtraction.

Documents U.S. Pat. No. B1-6,498,409 and U.S.-A1-2010/164425 disclose systems according to the preamble of claim 1.

SUMMARY OF THE INVENTION

Therefore, object of the present invention is solving the above prior art problems by providing a system and a process for determining offsets of measuring instruments, in particular measures with a null or constant mean value, that allows measuring the systematic errors depending from environmental conditions and sensor ageing.

Another object of the present invention is providing a system and a process for determining offsets of measuring instruments, in particular of measures with a null or constant mean value, that can be applied to any type of measure, such as linear and angular speed measures, linear and angular acceleration, in which it is necessary to remove the constant error part (gravity acceleration, for accelerometers), and/or the slowly-varying error part (due to temperature variation, pressure, sensor ageing, etc.) in any sensor, including those used on board ships.

Moreover, an object of the present invention is providing a system and a process for determining offsets of measuring instruments, in particular of measures with a null or constant mean value, that can be applied in applications in which the sensors are used, as working range of the measure, in the instrument error range (a few percentage units).

The above and other objects and advantages of the invention, as will appear from the following description, are obtained with a system for determining offsets of measuring instruments, in particular measures with a null or constant mean value, as claimed in claim 1.

Moreover, the above and other objects and advantages of the invention are obtained with a process for determining offsets of measuring instruments, in particular of measures with a null or constant mean value, as claimed in claim 6.

Preferred embodiments and non-trivial variations of the present invention are the subject matter of the dependent claims.

It will be immediately obvious that numerous variations and modifications (for example related to shape, sizes, arrangements and parts with equivalent functionality) can be made to what is described, without departing from the scope of the invention as appears from the enclosed claims.

BRIEF DESCRIPTION OF THE DRAWINGS

The present invention will be better described by some preferred embodiments thereof, provided as a non-limiting example, with reference to the single enclosed drawing, in which FIG. 1 is a block diagram showing a preferred embodiment of the system according to the present invention.

DETAILED DESCRIPTION OF PREFERRED EMBODIMENTS

With reference to FIG. 1, it is possible to note that the system 1 for determining offsets of measuring instruments, in particular of measures with a null or constant mean value, according to the present invention, is composed of:
 first processing means 3 adapted to compute, from at least one value of a measuring signal S deriving from an instantaneous measure performed by at least one measuring instrument or a sensor (not shown), at least one offset value δ of such signal S; and
 second processing means 5 adapted to subtract such offset value δ from the value of the instantaneous measuring signal S to obtain a corrected measure value S−δ of such signal S, therefore cleaned from the offset δ, and that can be possibly used for further processing.

In a preferred embodiment of the system 1 according to the present invention, the measuring error or the offset value δ is determined by computing a moving, possibly weighted, mean, and with an adequate number of samples, of the value of the measuring signal S: in such case, the first processing means 3 therefore comprise means for computing a moving mean of the measuring signal S value to determine such offset value δ.

Alternatively, the first processing means 3 comprise at least any one numeric low-pass filter, of the FIR (Finite Impulse Response) or IIR (Infinite Impulse Response) type or equivalent function implemented by PLC or by analogical circuit, adapted to determine such offset value δ from the measuring signal S value.

As further alternative, the first processing means 3 comprise at least any one analogue low-pass filter (of o a more or less high order), made as a circuit or through pre-set equivalent functions implemented by PLC, adapted to determine such offset value δ from the measuring signal S value.

In particular, the filter included in the first processing means 3 must have, among possible other components, a strong low-pass component with cutting frequency much lower than the useful band of the signal S. For example, for naval applications to stabilise the roll, the filter cutting frequency is on the order of magnitude of 10 minutes): in particular, it must be noted that if the filter included in the first processing means 3 is applied to a sensor such as an accelerometer without subtracting the gravity acceleration, it is able to estimate and subtract the constant and slowly-varying components, including the gravity acceleration variation depending on the height from the sea level (for aeronautical applications).

The present invention further refers to a process for determining offsets of measuring instruments, in particular measures with a null or constant mean value and using a system 1 as previously described. The process according to the present invention then comprises the steps of:

a) detecting at least one value of a measuring signal S deriving from an instantaneous measure performed by at least one measuring instrument or a sensor (not shown);
b) computing from such measuring signal S value at least one offset value δ of such signal S: such step can be performed, preferably, by computing a moving, possibly weighted, mean with an adequate number of samples, of the measuring signal S value, for example through the means for computing a moving, possibly weighted, mean, of the first processing means 3 of the system 1 according to the present invention. Alternatively, such step can be performed by any numeric low-pass filter, of the FIR (Finite Impulse Response), IIR (Infinite Impulse Response) type or an analogue low-pass filter of with an equivalent function implemented by PLC of the first processing means 3 of the system 1 according to the present invention; and
c) subtracting such offset value δ from the instantaneous measuring signal S value to obtain a corrected measure value S−δ of such signal S: such step can be performed, preferably, through the second processing means 5 of the system 1 according to the present invention.

Obviously, the system 1 and the process according to the present invention as previously described can be applied to all types of sensors: linear or angular position, speed and acceleration sensors, pressure, temperature, rate of flow, heading, etc. in any application where their use is necessary.

The invention claimed is:

1. A system for determining offsets of all types of measuring instruments and instrumentations, the system being composed of:
 first processing means adapted to compute, from at least one value of a measuring signal deriving from an instantaneous measure performed by at least one measuring instrument or a sensor, at least one offset value of the measuring signal; and
 second processing means adapted to subtract the offset value from the value of the measuring signal to obtain a corrected measure value of the measuring signal,
 wherein the measuring instruments are adapted to perform measures with a mean value that is null or constant, measuring the systematic errors depending from environmental conditions and ageing of the measuring sensors, the first processing means comprising means for computing a moving, possibly weighted, mean of the value of the measuring signal to determine the offset value, wherein the first processing means comprise at least one numeric low-pass filter of the Finite Impulse Response type or of the Infinite Impulse Response type implemented by a PLC adapted to determine the offset value from the value of the measuring signal.

2. The system of claim 1, wherein the numeric low-pass filter has a strong low-pass component with a cutting frequency much lower than the working band of the measuring signal.

3. The system of claim 2, wherein a cutting frequency of the numeric low-pass filter is on an order of magnitude of $1/600$ Hz with time constants on an order of 10 minutes.

4. The system of claim 1, wherein the first processing means comprise at least one analogue low-pass filter implemented by a PLC adapted to determine the offset value from the value of the measuring signal.

5. The system of claim 4, wherein the analogue low-pass filter has a strong low-pass component with a cutting frequency much lower than the working band of the measuring signal.

6. The system of claim 5, wherein a cutting frequency of the analogue low-pass filter is on an order of magnitude of 1/600 Hz with time constants on an order of 10 minutes.

7. Process for determining offsets of measuring instruments adapted to perform measures with a mean value that is null or constant through the system of claim 1, wherein the process comprises the steps of:
   a) detecting at least one value of a measuring signal deriving from an instantaneous measure performed by at least one measuring instrument or a sensor, computing a moving, possibly weighted, mean of the value of the measuring signal, in particular through the means for computing a moving, possibly weighted, mean of the first processing means of the system;
   b) computing from the value of the measuring signal at least one offset value of the measuring signal; and
   c) subtracting the offset value from the value of the measuring signal to obtain a corrected measure value of the measuring signal.

8. The process of claim 7, wherein step a) is performed through a numeric low-pass filter of a Finite Impulse Response type or of an Infinite Impulse Response type implemented by a PLC of the first processing means of the system.

9. The process of claim 7, wherein step a) is performed through an analogue low-pass filter implemented by a PLC of the first processing means of the system.

10. The process of claim 7, wherein step c) is performed through the second processing means of the system.

\* \* \* \* \*